United States Patent
Nix et al.

(10) Patent No.: US 10,969,782 B2
(45) Date of Patent: Apr. 6, 2021

(54) SYSTEMS AND METHODS FOR MATCHING AN AUTONOMOUS VEHICLE TO A RIDER

(71) Applicant: Uber Technologies, Inc., San Francisco, CA (US)

(72) Inventors: Molly Castle Nix, San Francisco, CA (US); Sean Chin, Pittsburgh, PA (US); Eric J. Hanson, San Francisco, CA (US); Richard Brian Donnelly, Pittsburgh, PA (US); Dennis Zhao, Pittsburgh, PA (US)

(73) Assignee: Uber Technologies, Inc., San Francisco, CA (US)

(*) Notice: Subject to any disclaimer, the term of this patent is extended or adjusted under 35 U.S.C. 154(b) by 225 days.

(21) Appl. No.: 15/799,323

(22) Filed: Oct. 31, 2017

(65) Prior Publication Data

US 2019/0094859 A1 Mar. 28, 2019

Related U.S. Application Data

(60) Provisional application No. 62/564,331, filed on Sep. 28, 2017.

(51) Int. Cl.
*G05D 1/00* (2006.01)
*H04W 4/021* (2018.01)
(Continued)

(52) U.S. Cl.
CPC .......... *G05D 1/0088* (2013.01); *G06Q 10/02* (2013.01); *G06Q 50/30* (2013.01); *H04W 4/021* (2013.01);
(Continued)

(58) Field of Classification Search
None
See application file for complete search history.

(56) References Cited

U.S. PATENT DOCUMENTS

| 5,289,369 A * | 2/1994 | Hirshberg | G06Q 10/02 235/382.5 |
|---|---|---|---|
| 8,118,223 B2 * | 2/2012 | Hammad | G06Q 30/0284 235/384 |

(Continued)

OTHER PUBLICATIONS

Patti, Antonion; Self-driving bus service models and passengers user experience; Aug. 2016; LinkedIn; https://www.linkedin.com/pulse/self-driving-bus-service-models-passengers-user-experience-patti (Year: 2016).*

(Continued)

*Primary Examiner* — David P. Merlino
(74) *Attorney, Agent, or Firm* — Dority & Manning, P.A, (57) ABSTRACT

Systems and methods are directed to matching an available vehicle to a rider requesting a service. In one example, a computer-implemented method includes obtaining, by a computing system comprising one or more computing devices, a service request from a rider. The method further includes obtaining, by the computing system, data indicative of a current location of the rider; and determining that the current location of the rider is within proximity of an autonomous vehicle queuing location. The method further includes providing, by the computing system, data to the rider to provide for selection of an available autonomous vehicle at the autonomous vehicle queuing location. The method further includes obtaining, by the computing system, rider authentication data upon a selection of an autonomous vehicle by the rider; and, in response to obtaining rider authentication data, matching an autonomous vehicle selected by the rider to provide for performance of the service request.

20 Claims, 5 Drawing Sheets

(51) Int. Cl.
   *H04W 12/06*    (2021.01)
   *G06Q 50/30*    (2012.01)
   *G06Q 10/02*    (2012.01)
   *H04W 12/00*    (2021.01)
   *H04W 4/40*     (2018.01)

(52) U.S. Cl.
   CPC .... *H04W 12/06* (2013.01); *G05D 2201/0213* (2013.01); *H04W 4/40* (2018.02); *H04W 12/00407* (2019.01); *H04W 12/00503* (2019.01)

(56) References Cited

U.S. PATENT DOCUMENTS

| | | | | |
|---|---|---|---|---|
| 9,229,905 | B1* | 1/2016 | Penilla | H04W 4/02 |
| 9,599,477 | B1* | 3/2017 | Aula | E05F 15/70 |
| 2003/0034873 | A1* | 2/2003 | Chase | G06Q 10/02 |
| | | | | 340/5.2 |
| 2012/0109721 | A1* | 5/2012 | Cebon | G06Q 30/06 |
| | | | | 705/13 |
| 2012/0208454 | A1* | 8/2012 | Chai | H04B 5/02 |
| | | | | 455/41.1 |
| 2014/0005921 | A1* | 1/2014 | Voronel | H04W 4/21 |
| | | | | 701/423 |
| 2015/0081362 | A1* | 3/2015 | Chadwick | G06Q 10/06311 |
| | | | | 705/7.14 |
| 2015/0310510 | A1* | 10/2015 | Kelly | G07B 13/00 |
| | | | | 705/13 |
| 2015/0339928 | A1 | 11/2015 | Ramanujam | |
| 2016/0247109 | A1* | 8/2016 | Scicluna | G08G 1/202 |
| 2016/0253848 | A1* | 9/2016 | Taniguchi | G07B 15/02 |
| | | | | 705/13 |
| 2018/0033310 | A1* | 2/2018 | Kentley-Klay | G06Q 10/02 |
| 2018/0067620 | A1* | 3/2018 | Adler | G06F 3/0486 |
| 2018/0209803 | A1* | 7/2018 | Rakah | G08G 1/012 |
| 2018/0322775 | A1* | 11/2018 | Chase | G01C 21/3492 |

OTHER PUBLICATIONS

Griswold, Alison; The first driverless buss on America's public roads travels only 1000 feet; Jan. 2017; Quartz; https://qz.com/884564/the-first-driverless-bus-on-americas-public-roads-only-travels-1000-feet/ (Year: 2017).*

Firnkorn Jorg et al., Free-floating electric carsharing-fleets in smart cities: The drawing of a post-private car era in urban environments?, Environmental Science & Policy, vol. 45, https://www.sciencedirect.com/science/article/pii/S1462901114001774, Jan. 2015, 11 pages.

PCT International Search Repeat and Written Opinion for PCT/US2018/050883, dated Nov. 22, 2018, pages.

* cited by examiner

SYSTEMS AND METHODS FOR MATCHING AN AUTONOMOUS VEHICLE TO A RIDER

This application claims the benefit of U.S. Provisional Application No. 62/564,331, filed Sep. 28, 2017, which is incorporated herein by reference.

FIELD

The present disclosure relates generally to operation of an autonomous vehicle for provision of a service. More particularly, the present disclosure relates to systems and methods that provide for matching an available autonomous vehicle to a rider requesting a service.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

However, in periods of high rider demand clustered at a location, it may be challenging for a rider to determine which autonomous vehicle has been assigned to provide service for their request. The systems and methods of the present disclosure provide means to address such challenges.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for matching an autonomous vehicle to a rider. The method includes obtaining, by a computing system comprising one or more computing devices, a service request from a rider. The method further includes determining, by the computing system, that the current location of the rider is within a proximity of an autonomous vehicle queuing location. The method further includes providing, by the computing system, data to the rider to provide for selection of an available autonomous vehicle at the autonomous vehicle queuing location. The method further includes obtaining, by the computing system, rider authentication data upon a selection of an autonomous vehicle by the rider. The method further includes, in response to a obtaining rider authentication data, matching, by the computing system, an autonomous vehicle selected by the rider to provide for performance of the service request.

Another example aspect of the present disclosure is directed to a computing system. The computing system includes one or more processors and one or more memories including instructions that, when executed by the one or more processors, cause the one or more processors to perform operations. The operations include obtaining a service request from a rider. The operations further include obtaining data indicative of a current location of the rider. The operations further include determining that the current location of the rider is within a proximity of an autonomous vehicle queuing location. The operations further include providing data to the rider to provide for selection of an available autonomous vehicle at the autonomous vehicle queuing location. The operations further include obtaining rider authentication data upon a selection of an autonomous vehicle by the rider. The operations further include, in response to a obtaining rider authentication data, matching an autonomous vehicle selected by the rider to provide for performance of the service request.

Another example aspect of the present disclosure is directed to one or more tangible, non-transitory computer-readable media storing computer-readable instructions that when executed by one or more processors cause the one or more processors to perform operations. The operations include obtaining a service request from a rider. The operations further include obtaining data indicative of a current location of the rider. The operations further include determining that the current location of the rider is within a proximity of an autonomous vehicle queuing location. The operations further include providing data to the rider to provide for selection of an available autonomous vehicle at the autonomous vehicle queuing location. The operations further include obtaining rider authentication data upon a selection of an autonomous vehicle by the rider. The operations further include, in response to a obtaining rider authentication data, matching an autonomous vehicle selected by the rider to provide for performance of the service request.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to matching an autonomous vehicle to a rider requesting a service. In particular, the systems and methods of the present disclosure can obtain a trip request from a rider and determine that the rider is within a particular area or location having availability of multiple autonomous vehicles. The systems and methods of the present disclosure can direct the rider to select an autonomous vehicle to provide the requested service and, upon selection of a vehicle (e.g., physically approaching or entering the vehicle), to initiate a rider authentication process. The systems and methods of the present disclosure can then match the selected autonomous vehicle to the rider. The autonomous vehicle can then be provided with data associated with the rider's service request and provide the requested service.

In particular, according to aspects of the present disclosure, a user (e.g., a rider) can request a vehicle service from an entity, such as a service provider, that maintains a fleet of vehicles including autonomous vehicles. The service provider can obtain information regarding the rider's current location and determine if the rider is within proximity of a location where multiple autonomous vehicles are staged to provide services to riders (e.g., within a geo-fence of a location or event venue, near a vehicle queuing location, etc.). If the rider is within proximity of such a location, the service provider can initiate a rider-match service for the rider rather than performing a general dispatching process. In a rider-match service, the rider can be directed to select an available autonomous vehicle. After the rider selects an available autonomous vehicle (e.g., approaches or gets into the available vehicle), the autonomous vehicle can then be matched to the rider, and the autonomous vehicle can then be provided with the rider's service request data to provide the requested service. Allowing for such rider-initiated matching in areas with high rider density, such as after an event, during peak rider times, and/or the like, can provide improvements to vehicle utilization and rider experience.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the vehicle (e.g., located on or within the autonomous vehicle). The vehicle computing system can receive sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, the autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the fleet of vehicles. Further, the operations computing system can provide a rider-driven vehicle matching process where the rider selects an available autonomous vehicle and then initiates an action (e.g., rider authentication) to match the vehicle to the rider to enable performance of the rider's service request.

According to example aspects of the present disclosure, an operations computing system associated with a service provider can receive a request for a vehicle service (e.g., a trip request) from a user (e.g., a rider), for example, through a vehicle service application associated with the service provider and operating on the rider's user device. The operations computing system can obtain data regarding the rider's current location (e.g., from the rider's user device) and determine if the rider's current location is within a certain proximity of a location where one or more autonomous vehicles are available to provide requested vehicle services. For example, the rider may be within a defined proximity of a venue or other event location (e.g., within a geo-fence defined around the location) or within proximity of a designated autonomous vehicle queuing area. The operations computing system can then provide data to the rider (e.g., using the vehicle service application) directing the rider to one or more available autonomous vehicles (e.g., how the rider can find and select an available autonomous vehicle). The rider can then select one of the available autonomous vehicles. For example, in some implementations, a rider can select an available vehicle by moving within a close proximity of the vehicle, physically getting into the available vehicle, and/or the like. Upon making the selection, the rider can initiate a matching process to match the selected autonomous vehicle to the rider, such as by performing rider authentication. The operations computing system can then provide the rider's vehicle service request data (e.g., trip data) to the matched autonomous vehicle and the autonomous vehicle can provide the requested service.

In some implementations, rider-initiated vehicle matching can be provided in defined queuing area or along defined routes. As an example, a number of autonomous vehicles configured for rider-initiated matching can be operated in a cycle through defined locations and/or routes, for example, during peak travel times. A rider requesting service can be directed to one of the defined locations where available vehicles are expected to cycle through on a defined frequency (e.g., every 10 minutes, 15 minutes, etc.). The rider can then select an available vehicle as it arrives at the location and initiate the rider authentication to match the selected vehicle to the rider.

In some implementations, when a rider requests a vehicle service and a rider-initiated vehicle match service is being provided along a route that coincides with the rider's origination and destination points (e.g., there is a threshold density of vehicles around the rider going that way at any given point), the rider can be notified of the rider-initiated vehicle match service and directed to select one of the designated available autonomous vehicles which can then be matched to the rider.

According to another aspect of the present disclosure, in some implementations, an autonomous vehicle can outwardly communicate its status as being in an available or open state. In some implementations, for example, available autonomous vehicles located within a geo-fence or a vehicle queuing location can display one or more indications that they are available for rider selection to provide a vehicle service. As one example, an available autonomous vehicle can change the color, pattern, etc. of one or more indicators, lights, displays, and/or the like to indicate that the vehicle is available in a rider-initiated match mode.

According to another aspect of the present disclosure, a selected autonomous vehicle can be matched with the rider upon the successful completion of a rider authentication process. For example, the rider can select or enter any one of the available autonomous vehicles and initiate an authentication process. In some implementations, the rider authentication can be completed using a radio frequency (RF) communication system, for example, Bluetooth, Bluetooth Low Energy (BLE), Near Field Communication (NFC), and/or the like. For example, the autonomous vehicle computing system or the like can determine that the rider's user device is within a certain proximity of the vehicle, inside the vehicle, and/or the like, using RF communication. In some implementations, the rider can be provided with a code or identification number (e.g., PIN) upon completing the service request (e.g., via an application in the rider's user device) which the rider can enter using a device associated with the autonomous vehicle (e.g., a touchscreen, tablet, keypad, etc.) to authenticate the rider.

According to another aspect of the present disclosure, in some implementations, the selection of an available autonomous vehicle by a rider may include differentiating based on vehicle platforms. For example, a service provider may provide queuing for multiple types of vehicles (e.g., different vehicle sizes/capacities, different accessibility, etc.) within an autonomous vehicle queuing location (e.g., geo-fenced location, pickup location, etc.). As part of the rider's request for a vehicle service, the rider can indicate which type of vehicle they would like to have provide the requested service. The rider can them be directed to select one of that type of vehicle within the designated location/area. In such implementations, the rider authentication process can be restricted to the selected type of vehicle such that the rider cannot select an available vehicle of a different type and be matched with that different type vehicle.

According to another aspect of the present disclosure, in some implementations, autonomous vehicles may be operated in a defined pool configuration. For example, a number of autonomous vehicles may be operated along a defined route, for example from a first location to a second location and then returning to the first location, during peak time periods and allowing multiple independent riders to share an autonomous vehicle. A rider may request a pool trip along the route and select to join the next available autonomous vehicle. The rider may then be physically approach the available autonomous vehicle and the vehicle will be matched to the rider for the requested service. In some implementations, the autonomous vehicle may be configured to provide (e.g., display) one or more indications of availability, available capacity, and/or the like.

The systems and methods described herein may provide a number of technical effects and benefits. For instance, allowing for matching autonomous vehicles to riders after a rider is located at or near the vehicle in accordance with example aspects of the present disclosure can provide for more efficient management of rider demand and fleet resources, thereby improving vehicle utilization as well as the autonomous vehicle-rider experience.

The systems and methods described herein may also provide a technical effect and benefit of reducing rider wait time and improving rider experience, for example, at larger events where demand is increased for a block of time. By allowing an increased supply of autonomous vehicles to be provided during peak times to be matched to riders at the location in accordance with the present disclosure, a rider can more quickly and efficiently be provided with a requested service. This can reduce latencies resulting from receiving increased requests at a server provider system over a network.

The systems and methods described herein may also provide resulting improvements to computing technology tasked with operations of an autonomous vehicle, such as routing and user experience. For example, by allowing available vehicles to be matched to riders at a location, a service provider's operations computing system may be able to optimize processing and efficiency by reducing the processing required for matching a rider with an available vehicle. In addition, bandwidth can be increased for receiving rider requests by more efficiently accommodating requests at times of high demand.

With reference to the figures, example embodiments of the present disclosure will be discussed in further detail.

Figure 1:
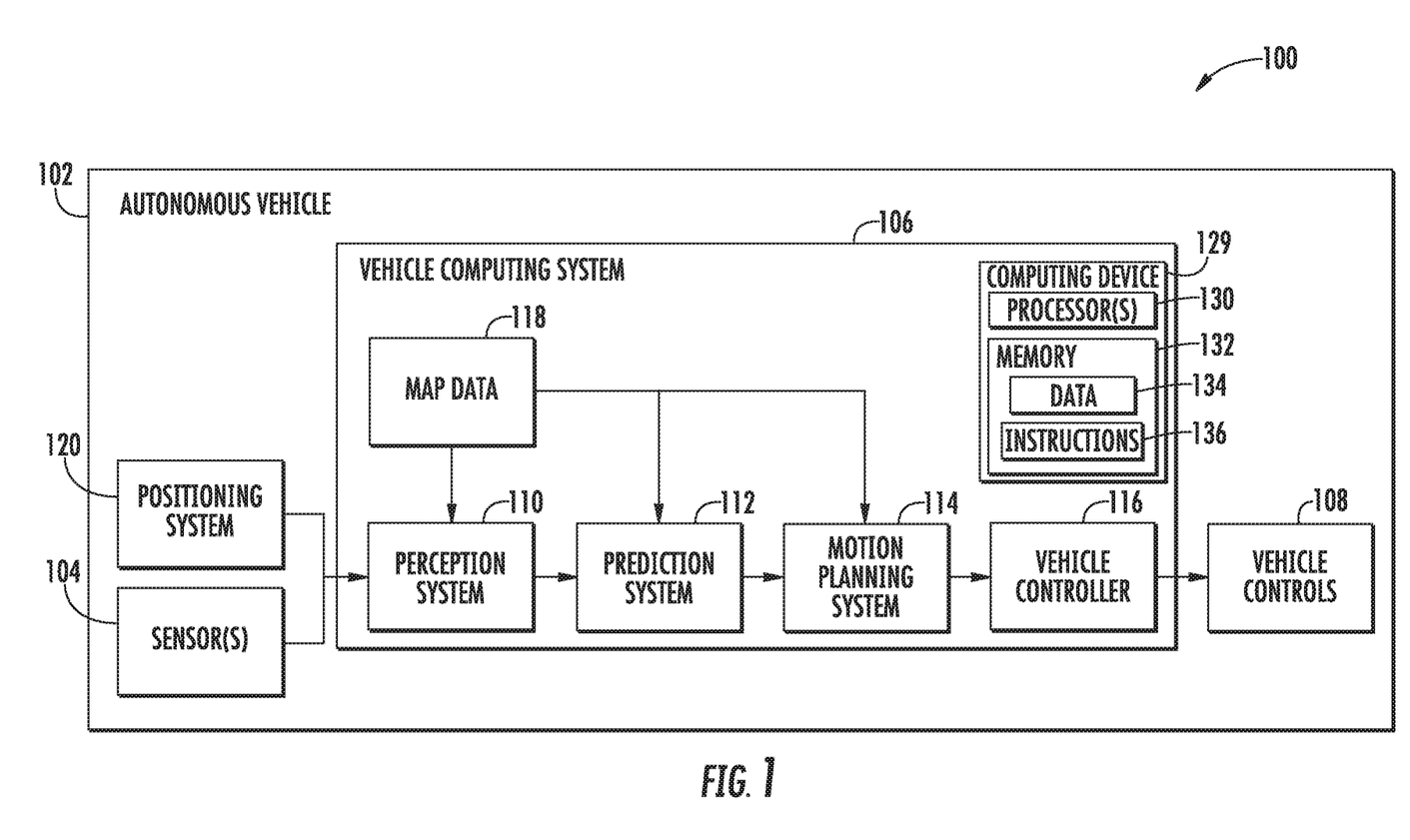
FIG. 1 depicts a block diagram of an example system for controlling the navigation of a vehicle according to example embodiments of the present disclosure.

FIG. 1 depicts a block diagram of an example system 100 for controlling the navigation of an autonomous vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode, semi-autonomous operational mode, and/or a non-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 129, within the vehicle computing system 106.

In some implementations, vehicle computing system 106 can further include a positioning system 120. The positioning system 120 can determine a current position of the autonomous vehicle 102. The positioning system 120 can be any device or circuitry for analyzing the position of the autonomous vehicle 102. For example, the positioning system 120 can determine position by using one or more of inertial sensors, a satellite positioning system, based on IP address, by using triangulation and/or proximity to network access points or other network components (e.g., cellular towers, WiFi access points, etc.) and/or other suitable techniques for determining position. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for LIDAR system, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR system, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan.

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

Figure 2:
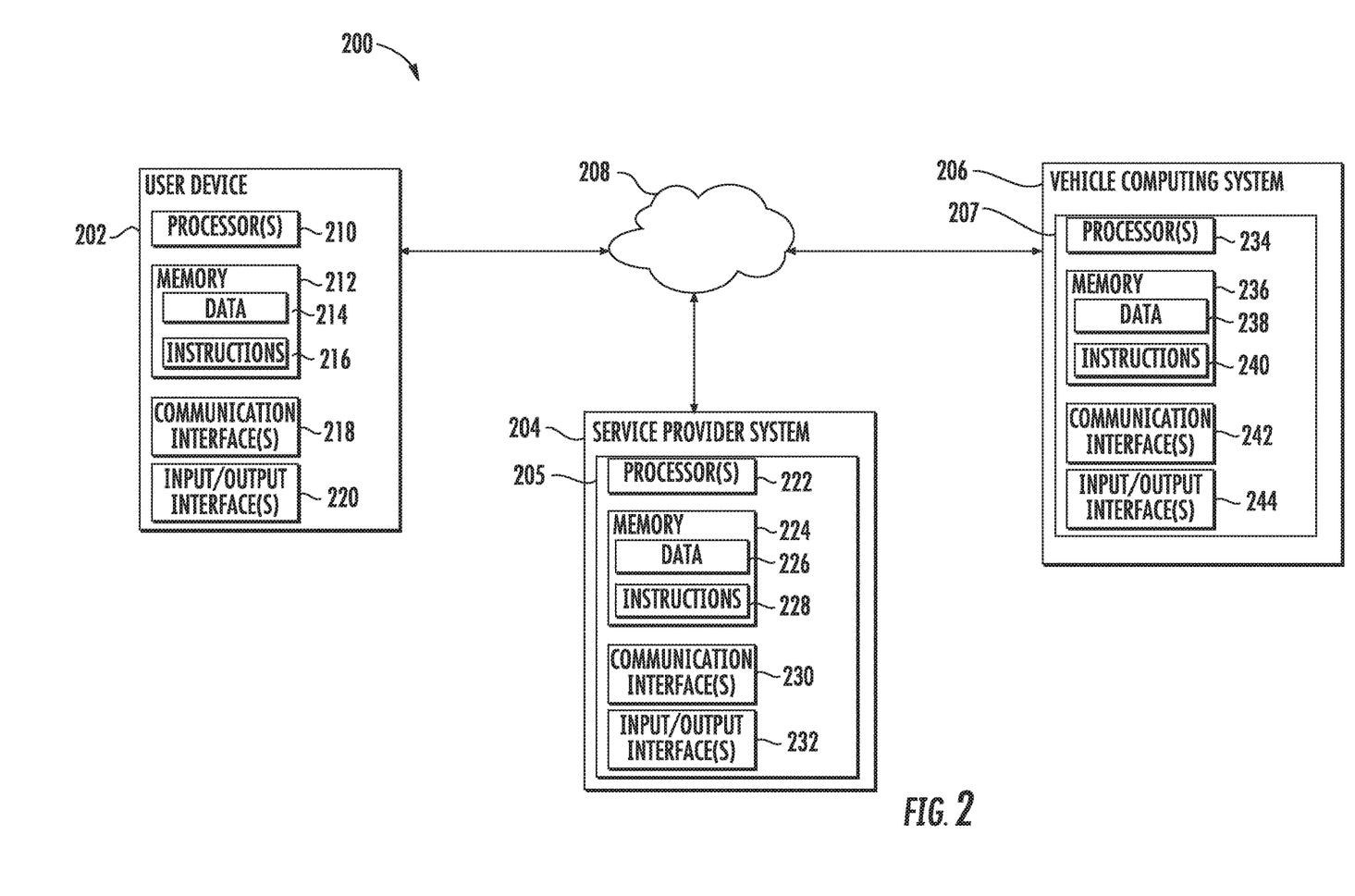
FIG. 2 depicts a block diagram of an example system according to example embodiments of the present disclosure.

FIG. 2 depicts a block diagram of an example system 200 according to example embodiments of the present disclosure. The example system 200 illustrated in FIG. 2 is provided as an example only. The components, systems, connections, and/or other aspects illustrated in FIG. 2 are optional and are provided as examples of what is possible, but not required, to implement the present disclosure. FIG. 2 illustrates an example system 200 including a service platform system 204, vehicle computing system(s) 206, and user device(s) 202 that can be communicatively coupled to one another over one or more network(s) 208 and can provide one or more operations in accordance with example embodiments of the systems and methods of the present disclosure.

As illustrated, a user device 202 may provide a user with access to an application platform, such as a ride sharing platform, maintained by a service provider and allow the user to establish/maintain a user account for the application platform, request services associated with the application platform, and/or establish/maintain a rider profile including preferences for the provided services. The user device 202 can be any type of computing device, such as, for example, a personal computing device (e.g., laptop, desktop, etc.), a mobile computing device (e.g., smartphone, tablet, etc.), a gaming console or controller, a wearable computing device, an embedded computing device, a personal assistant computing device, or any other type of computing device.

More particularly, the user device 202 can include one or more processor(s) 210 and at least one memory 212. The one or more processors 210 can be any suitable processing device (e.g., a processor core, a microprocessor, an ASIC, a FPGA, a controller, a microcontroller, etc.) and can be one processor or a plurality of processors that are operatively connected. The memory 212 can include one or more non-transitory computer-readable storage mediums, such as RAM, ROM, EEPROM, EPROM, flash memory devices, magnetic disks, etc., and combinations thereof. The memory 212 can store data 214 and computer-readable instructions 216 which are executed by the processor 210 to cause the user device 202 to perform operations, such as those described herein. The instructions 216 can be software written in any suitable programming language or can be implemented in hardware. Additionally, or alternatively, the instructions 216 can be executed in logically and/or virtually separate threads on processor(s) 210.

In some implementations, the one or more processors 210 and at least one memory 212 may be comprised in one or more computing devices within the user device 202. In some implementations, the user device 202 can obtain data from one or more memory device(s) that are remote from the user device 202.

The user device 202 can also include one or more input/output interface(s) 220 that can be used to receive input, such as from a user, and provide output, such as for display and/or playback to a user. The input/output interface(s) 220 can include, for example, devices for receiving information from or providing information to a user, such as a display device, touch screen, touch pad, mouse, data entry keys, an audio output device such as one or more speakers, a microphone, haptic feedback device, etc. The input/output interface(s) 220 can be used, for example, by a user to control operation of the user device 202.

The user device 202 can also include one or more communication interface(s) 218 used to communicate with one or more systems or devices, including systems or devices that are remotely located from the user device 202, such as service platform system 204 and/or the like, for example. The communication interface(s) 218 can include any circuits, components, software, etc. for communicating with one or more networks (e.g., network 208). In some implementations, the communication interface(s) 218 can include, for example, one or more of a communications controller, receiver, transceiver, transmitter, port, conductors, software, and/or hardware for communicating data.

The network(s) 208 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 208 can be accomplished, for instance, via a communication interface using any type of protocol, protection scheme, encoding, format, packaging, etc.

As further illustrated, the system 200 can include a service platform system 204 which can provide services for an application platform, for example, maintained by a service provider, such as a ride sharing application. For example, the service platform system 204 can communicate with one or more user devices 202 to provide user access to an application platform. The service platform system 204 can also communicate with one or more vehicle computing systems 206 to provision services associated with an application platform, such as a ride sharing platform, delivery service platform, courier service platform, and/or other service platform. The service platform system 204 can be associated with a central operations system and/or an entity associated with an autonomous vehicle and/or application platform such as, for example, a vehicle owner, vehicle manager, fleet operator, service provider, etc.

More particularly, the service platform system 204 can include one or more computing device(s) 205 to perform operations associated with an application platform. The computing device(s) 205 can include one or more processor(s) 222 and at least one memory 224. The one or more processors 222 can be any suitable processing device (e.g., a processor core, a microprocessor, an ASIC, a FPGA, a controller, a microcontroller, etc.) and can be one processor or a plurality of processors that are operatively connected. The memory 224 can include one or more non-transitory computer-readable storage mediums, such as RAM, ROM, EEPROM, EPROM, flash memory devices, magnetic disks, etc., and combinations thereof.

The memory 224 can store data 226 and computer-readable instructions 228 which are executed by the processor 222 to cause the computing device(s) 205 to perform operations such as those described herein. The instructions 228 can be software written in any suitable programming language or can be implemented in hardware. Additionally, or alternatively, the instructions 228 can be executed in logically and/or virtually separate threads on processor(s) 222. For example, the memory 224 can store instructions 228 that when executed by the one or more processors 222 cause the one or more processors 222 to perform any of the operations and/or functions described herein, including, for example, one or more operations of FIG. 3 and/or FIG. 4. Additionally, in some implementations, the memory 224 can store data 226 which can include data such as described herein and the service platform system 204 can provide at least some portion of the data to one or more remote computing systems, such as a vehicle computing system in an autonomous vehicle (e.g., vehicle computing system 106 of FIG. 1) and/or user device 202, for example.

In some implementations, the one or more processors 222 and at least one memory 224 may be comprised in one or more computing devices within the service platform system 204. In some implementations, the service platform system 204 can obtain data from one or more memory device(s) that are remote from the service platform system 204.

The one or more computing device(s) 205 included in service platform system 204 can also include one or more input/output interface(s) 232 that can be used to receive input, such as from a user, and provide output, such as for display or playback to a user. The input/output interface(s) 232 can include, for example, devices for receiving information from or providing information to a user, such as a display device, touch screen, touch pad, mouse, data entry keys, an audio output device such as one or more speakers, a microphone, haptic feedback device, etc. The input/output interface(s) 232 can be used, for example, by a user to control operation of the computing device(s) 205 included in service platform system 204.

The computing device(s) 205 can also include one or more communication interface(s) 230 used to communicate with one or more systems or devices, including systems or devices that are remotely located from the computing device(s) 205, such as a user device 202, a vehicle computing system 206, and/or the like, for example. The communication interface(s) 230 can include any circuits, components, software, etc. for communicating with one or more networks (e.g., network 208). In some implementations, the communication interface(s) 230 can include, for example, one or more of a communications controller, receiver, transceiver, transmitter, port, conductors, software, and/or hardware for communicating data.

In some implementations, the service platform system 204 can include one or more server computing devices. If the service platform system 204 includes multiple server computing devices, such server computing devices can operate according to various computing architectures, including, for example, sequential computing architectures, parallel computing architectures, or some combination thereof.

As further illustrated, the system 200 can include a vehicle computing system 206 (e.g., included in an autonomous vehicle such as autonomous vehicle 102 of FIG. 1) can provide operations for controlling an autonomous vehicle. In some implementations, the vehicle computing system 206 can perform autonomous vehicle motion planning and enable operation of an autonomous vehicle, as described herein.

More particularly, the vehicle computing system 206 can include one or more computing device(s) 207 to perform operations associated with an autonomous vehicle. The computing device(s) 207 can include one or more processor(s) 234 and at least one memory 236. The one or more processor(s) 234 can be any suitable processing device (e.g., a processor core, a microprocessor, an ASIC, a FPGA, a controller, a microcontroller, etc.) and can be one processor or a plurality of processors that are operatively connected. The memory 236 can include one or more non-transitory computer-readable storage mediums, such as RAM, ROM, EEPROM, EPROM, flash memory devices, magnetic disks, etc., and combinations thereof.

The memory 236 can store data 238 and computer-readable instructions 240 which are executed by the processor(s) 234 to cause the computing device(s) 207 to perform operations such as described herein, including providing for operation of an autonomous vehicle to provide a requested service to a rider, for example. The instructions 240 can be software written in any suitable programming language or can be implemented in hardware. Additionally, or alternatively, the instructions 240 can be executed in logically and/or virtually separate threads on processor(s) 234. For example, the memory 236 can store instructions 240 that when executed by the one or more processor(s) 234 cause the one or more processor(s) 234 to perform any of the operations and/or functions described herein, including, for example, one or more operations of FIG. 3 and/or FIG. 4.

In some implementations, the one or more processor(s) 234 and at least one memory 236 may be comprised in one or more computing devices within the vehicle computing system 206. In some implementations, the vehicle computing system 206 can obtain data from one or more memory device(s) that are remote from the vehicle computing system 206.

The one or more computing device(s) 207 included in vehicle computing system 206 can also include one or more input/output interface(s) 244 that can be used to receive input, such as from a user, and provide output, such as for display or playback to a user. The input/output interface(s) 244 can include, for example, devices for receiving information from or providing information to a user, such as a display device, touch screen, touch pad, mouse, data entry keys, an audio output device such as one or more speakers, a microphone, haptic feedback device, etc. The input/output interface(s) 244 can be used, for example, by a user to control operation of the computing device(s) 207 included in vehicle computing system 206.

The computing device(s) 207 can also include one or more communication interface(s) 242 used to communicate with one or more systems or devices, including systems and devices on-board an autonomous vehicle as well as systems or devices that are remotely located from the computing device(s) 207 and/or the autonomous vehicle, such as service platform system 204, user device 202, and/or the like, for example. The communication interface(s) 242 can include any circuits, components, software, etc. for communicating with one or more networks (e.g., network 208). In some implementations, the communication interface(s) 242 can include, for example, one or more of a communications controller, receiver, transceiver, transmitter, port, conductors, software, and/or hardware for communicating data.

Figure 3:
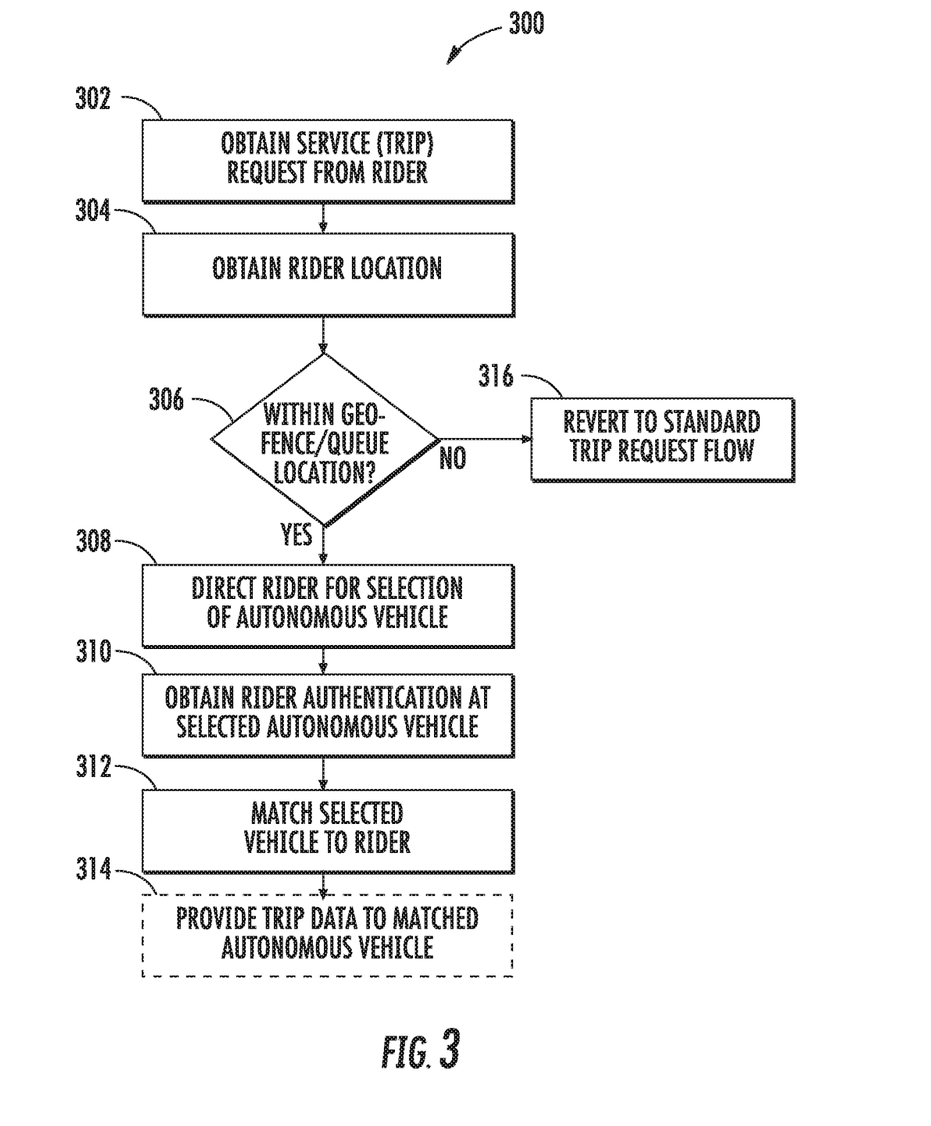
FIG. 3 depicts a flowchart diagram of an example method for matching an autonomous vehicle to a rider to provide a service request according to example embodiments of the present disclosure.

FIG. 3 depicts a flowchart diagram of an example method 300 for matching an autonomous vehicle to a rider to provide a service request according to example embodiments of the present disclosure. One or more portion(s) of the operations 300 can be implemented by one or more computing devices such as, for example, an operations computing system, the service platform system 204 of FIG. 2, the vehicle computing system 106 of FIG. 1, the computing system 106 and/or the remote computing system 510 of FIG. 5 and/or the like. Moreover, one or more portion(s) of the operations 300 can be implemented as an algorithm on the hardware components of the device(s) described herein (e.g., as in FIGS. 1, 2, and 5) to, for example, provide for matching an available autonomous vehicle to a rider requesting a service.

At 302, one or more computing devices included within a computing system (e.g., an operations computing system, a service platform system 204, and/or the like) can obtain a vehicle service request (e.g., a trip request) from a rider. For example, a rider may request a vehicle service from a service provider that maintains a fleet of vehicles including autonomous vehicles. A computing system associated with the service provider (e.g., an operations computing system) can receive the vehicle service request from the rider, for example, through a vehicle service application associated with the service provider which is operating on the rider's user device.

At 304, the computing system can obtain a current location of the rider, for example, by obtaining location data from the rider's user device.

At 306, the computing system can determine, based at least in part on the current location of the rider, if the rider is within proximity of a location where one or more available autonomous vehicles may be staged or queued to provide services to riders. For example, the current position of the rider may be within a defined proximity of a venue or other event location (e.g., within a geo-fence defined around the location) or within proximity of a designated autonomous vehicle queuing area. In some implementations, if the rider is within proximity of such a location, the service provider (e.g., via the computing system) can initiate a rider-match service for the rider rather than performing a general dispatching process.

If at 306, the computing system determines that the rider is within proximity of a location where one or more available autonomous vehicles may be staged or queued to provide services to riders (e.g., within a geo-fence, at or near a queuing location, etc.), operation can continue to 308. If, at 306, the computing system determines that the rider is not within proximity of a location where one or more available autonomous vehicles may be staged or queued to provide services to riders, operation can move to 316.

At 308, the computing system can provide data to the rider (e.g., via a vehicle service application operating on the rider's user device, etc.) to provide for selection of an available autonomous vehicle at the autonomous vehicle queuing location. For example, the computing system can provide data to the rider directing the rider to the location of one or more available vehicles within the geo-fence or at the vehicle queuing location (e.g., a particular parking spot, particular area within the geo-fence or queuing location, and/or the like). In some implementations, the computing system can provide data to the rider regarding how the rider can identify and select an available autonomous vehicle at the location.

In some implementations, an autonomous vehicle can outwardly communicate its status as being in an available or open state. For example, in some implementations, available autonomous vehicles located within a geo-fence or a vehicle queuing location can display one or more indications that they are available for rider selection to provide a vehicle service. As one example, an available autonomous vehicle can change the color, pattern, etc. of one or more indicators, lights, displays, and/or the like to indicate that the vehicle is available in a rider-initiated match mode.

At 310, after the rider has selected an available autonomous vehicle, the computing system can obtain rider authentication data from the rider (e.g., via a vehicle service application operating on the rider's user device, etc.). For example, in some implementations, a rider can select an available autonomous vehicle by moving within a close proximity of the vehicle, physically getting into the available autonomous vehicle, and/or the like. Upon determination of the selection, a matching process to match the selected autonomous vehicle to the rider can be initiated, such as by performing rider authentication.

In some implementations, the rider authentication can be completed using a RF communication system, for example, Bluetooth, BLE, NFC, and/or the like. For example, in some implementations, an autonomous vehicle computing system and/or the like can determine that the rider's user device is within a certain proximity of the vehicle, inside the vehicle, and/or the like, using RF communication. The computing system can then obtain rider identifying data from the rider's user device (e.g., via the vehicle service application) to authenticate the rider. As another example, in some implementations, the rider can be provided with a code or identification number (e.g., PIN) upon completing the service request (e.g., via the vehicle service application on the rider's user device) which the rider can enter using a device associated with the autonomous vehicle (e.g., a touchscreen, tablet, keypad, etc.) to authenticate the rider.

At 312, in response to a obtaining the rider authentication data, the computing system can match the selected autonomous vehicle to the rider (e.g., associate the selected autonomous vehicle with the rider's service request) to provide for performance of the rider's service request.

At 314, the computing system can provide the rider's request/trip data to the autonomous vehicle to provide for the autonomous vehicle to initiate the requested service for the rider.

At 316, if the computing system determined that the rider is not within proximity of a location where one or more available autonomous vehicles may be staged or queued to provide services to riders, the computing system can revert to a standard trip request response process (e.g., assigning and sending an autonomous vehicle to pick up the rider).

Figure 4:
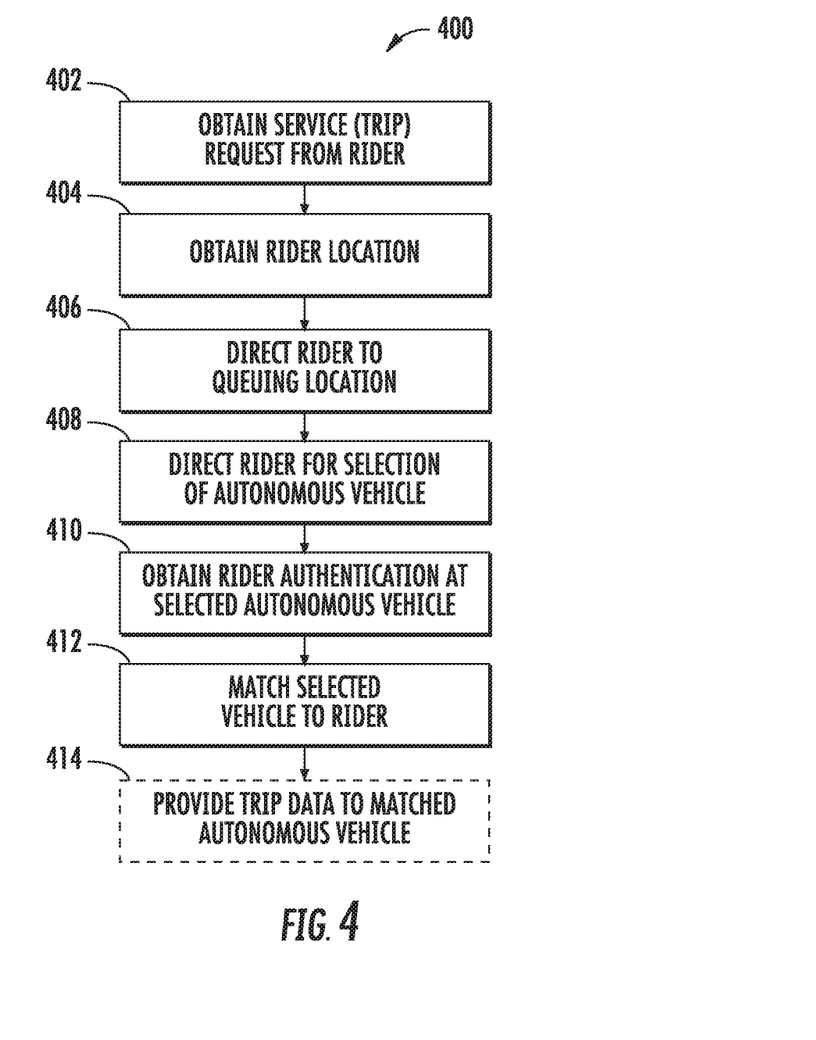
FIG. 4 depicts a flowchart diagram of an example method for matching an autonomous vehicle to a rider to provide a service request according to example embodiments of the present disclosure.

FIG. 4 depicts a flowchart diagram of an example method 400 for matching an autonomous vehicle to a rider to provide a service request according to example embodiments of the present disclosure. One or more portion(s) of the operations 400 can be implemented by one or more computing devices such as, for example, an operations computing system, the service platform system 204 of FIG. 2, the vehicle computing system 106 of FIG. 1, the computing system 106 and/or the remote computing system 510 of FIG. 5 and/or the like. Moreover, one or more portion(s) of the operations 400 can be implemented as an algorithm on the hardware components of the device(s) described herein (e.g., as in FIGS. 1, 2, and 5) to, for example, provide for matching an available autonomous vehicle to a rider requesting a service.

At 402, one or more computing devices included within a computing system (e.g., an operations computing system, a service platform system 204, and/or the like) can obtain a vehicle service request (e.g., a trip request) from a rider. For example, a rider may request a vehicle service from a service provider that maintains a fleet of vehicles including autonomous vehicles. A computing system associated with the service provider (e.g., an operations computing system) can receive the vehicle service request from the rider, for example, through a vehicle service application associated with the service provider which is operating on the rider's user device.

At 404, the computing system can obtain a current location of the rider, for example, by obtaining location data from the rider's user device.

At 406, the computing system can provide data to the rider (e.g., via a vehicle service application operating on the rider's user device, etc.) directing the rider to an available vehicle queuing location. For example, in some implementations, rider-initiated vehicle matching can be provided in defined queuing areas or along defined vehicle routes. As an example, a number of autonomous vehicles configured for rider-initiated matching can be operated in a cycle through defined locations and/or routes, for example, during peak travel times. A rider who is requesting a vehicle service can be directed to one of the defined locations where available autonomous vehicles are expected to cycle through on a defined frequency (e.g., every 10 minutes, 15 minutes, etc.).

As another example, in some implementations, when a rider requests a vehicle service and a rider-initiated vehicle match service is being provided along a route that coincides with the rider's origination and destination points (e.g., there is a threshold density of autonomous vehicles around the rider going that way at any given point), the rider can be notified of the rider-initiated vehicle match service and directed to an available vehicle queuing location.

At 408, the computing system can provide data to the rider (e.g., via a vehicle service application operating on the rider's user device, etc.) to provide for selection of an available autonomous vehicle at the autonomous vehicle queuing location. For example, the computing system can provide data to the rider regarding how the rider can identify and select an available autonomous vehicle at the location. In some implementations, such as where rider-initiated vehicle matching is provided in defined a queuing area or along defined routes, a rider requesting a vehicle service can be provided with data regarding selecting an available vehicle as it arrives at the location.

In some implementations, an autonomous vehicle can outwardly communicate its status as being in an available or open state. For example, in some implementations, available autonomous vehicles located or arriving at a vehicle queuing location can display one or more indications that they are available for rider selection to provide a vehicle service. As one example, an available autonomous vehicle can change the color, pattern, etc. of one or more indicators, lights, displays, and/or the like to indicate that the vehicle is available in a rider-initiated match mode.

At 410, after the rider has selected an available autonomous vehicle, the computing system can obtain rider authentication data from the rider (e.g., via a vehicle service application operating on the rider's user device, etc.). For example, in some implementations, a rider can select an available autonomous vehicle by moving within a close proximity of the vehicle, physically getting into the available autonomous vehicle, and/or the like. Upon determination of the selection, a matching process to match the selected autonomous vehicle to the rider can be initiated, such as by performing rider authentication.

In some implementations, the rider authentication can be completed using a RF communication system, for example, Bluetooth, BLE, NFC, and/or the like. For example, in some implementations, an autonomous vehicle computing system and/or the like can determine that the rider's user device is within a certain proximity of the vehicle, inside the vehicle, and/or the like, using RF communication. The computing system can then obtain rider identifying data from the rider's user device (e.g., via the vehicle service application) to authenticate the rider. As another example, in some implementations, the rider can be provided with a code or identification number (e.g., PIN) upon completing the service request (e.g., via the vehicle service application on the rider's user device) which the rider can enter using a device associated with the autonomous vehicle (e.g., a touchscreen, tablet, keypad, etc.) to authenticate the rider.

At 412, in response to a obtaining the rider authentication data, the computing system can match the selected autonomous vehicle to the rider (e.g., associate the selected autonomous vehicle with the rider's service request) to provide for performance of the rider's service request.

At 414, the computing system can provide the rider's request/trip data to the autonomous vehicle to provide for the autonomous vehicle to initiate the requested service for the rider.

Figure 5:
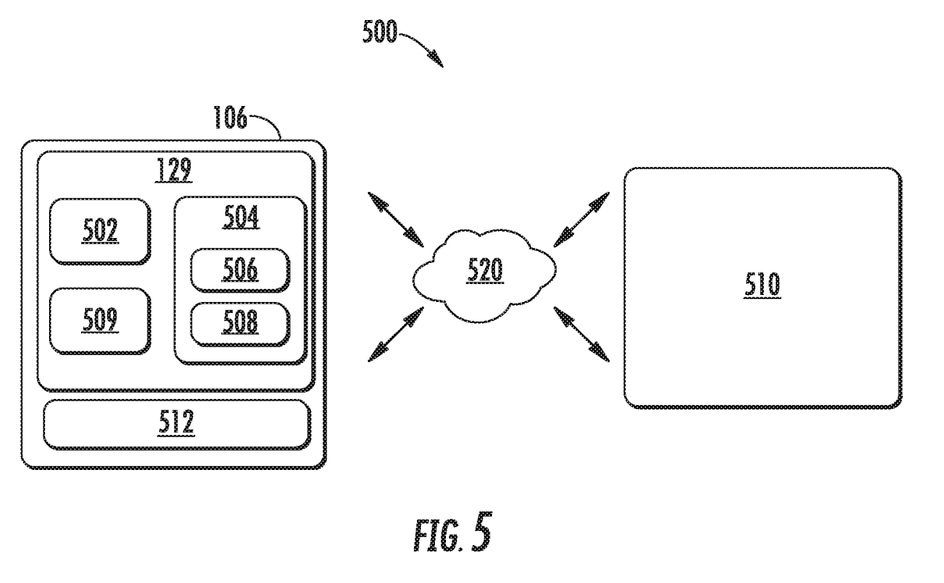
FIG. 5 depicts a block diagram of an example computing system according to example embodiments of the present disclosure.

FIG. 5 depicts a block diagram of an example computing system 500 according to example embodiments of the present disclosure. The example computing system 500 illustrated in FIG. 5 is provided as an example only. The components, systems, connections, and/or other aspects illustrated in FIG. 5 are optional and are provided as examples of what is possible, but not required, to implement the present disclosure. The example computing system 500 can include the vehicle computing system 106 of the autonomous vehicle 102 and, in some implementations, a remote computing system 510 including remote computing device(s) that is remote from the autonomous vehicle 102 (e.g., an operations computing system) that can be communicatively coupled to one another over one or more networks 520. The remote computing system 510 can be associated with a central operations system and/or an entity associated with the autonomous vehicle 102 such as, for example, a vehicle owner, vehicle manager, fleet operator, service provider, etc.

The computing device(s) 129 of the vehicle computing system 106 can include processor(s) 502 and a least one memory 504. The one or more processors 502 can be any suitable processing device (e.g., a processor core, a microprocessor, an ASIC, a FPGA, a controller, a microcontroller, etc.) and can be one processor or a plurality of processors that are operatively connected. The memory 504 can include one or more non-transitory computer-readable storage media, such as RAM, ROM, EEPROM, EPROM, one or more memory devices, flash memory devices, etc., and combinations thereof.

The memory 504 can store information that can be accessed by the one or more processors 502. For instance, the memory 504 (e.g., one or more non-transitory computer-readable storage mediums, memory devices) on-board the autonomous vehicle 102 can include computer-readable instructions 506 can be executed by the one or more processors 502. The instructions 506 can be software written in any suitable programming language or can be implemented in hardware. Additionally, or alternatively, the instructions 506 can be executed in logically and/or virtually separate threads on processor(s) 502.

For example, the memory 504 on-board the autonomous vehicle 102 can store instructions 506 that when executed by the one or more processors 502 on-board the autonomous vehicle 102 cause the one or more processors 502 (the vehicle computing system 106) to perform operations such as any of the operations and functions of the computing device(s) 129 or for which the computing device(s) 129 are configured, as described herein including, for example, operations of FIG. 3 and/or FIG. 4.

The memory 504 can store data 508 that can be obtained, received, accessed, written, manipulated, created, and/or stored. The data 508 can include, for instance, sensor data, map data, data identifying detected objects including current object states and predicted object locations and/or trajectories, service request data (e.g., trip and/or user data), motion plans, etc., as described herein. In some implementations, the computing device(s) 129 can obtain data from one or more memory device(s) that are remote from the autonomous vehicle 102.

The computing device(s) 129 can also include one or more communication interfaces 509 used to communicate with one or more other system(s) on-board the autonomous vehicle 102 and/or a remote computing device that is remote from the autonomous vehicle 102 (e.g., of remote computing system 510). The communication interface 509 can include any circuits, components, software, etc. for communicating with one or more networks (e.g., 520). In some implementations, the communication interface 509 can include for example, one or more of a communications controller, receiver, transceiver, transmitter, port, conductors, software, and/or hardware for communicating data.

In some implementations, the vehicle computing system 106 can further include a positioning system 512. The positioning system 512 can determine a current position of the autonomous vehicle 102. The positioning system 512 can be any device or circuitry for analyzing the position of the autonomous vehicle 102. For example, the positioning system 512 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 102 can be used by various systems of the vehicle computing system 106.

The network(s) 520 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 520 can be accomplished, for instance, via a communication interface using any type of protocol, protection scheme, encoding, format, packaging, etc.

The remote computing system 510 can include one or more remote computing devices that are remote from the vehicle computing system 106. The remote computing devices can include components (e.g., processor(s), memory, instructions, data, etc.) similar to that described herein for the computing device(s) 129. Moreover, the remote computing system 510 can be configured to perform one or more operations of an operations computing system, as described herein including, for example, operations of FIG. 3 and/or FIG. 4.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for matching an autonomous vehicle to a rider comprising:
    obtaining, by a computing system comprising one or more computing devices, a service request from the rider, wherein the service request is indicative of a requested vehicle type;
    obtaining, by the computing system, data indicative of a current location of the rider;
    determining, by the computing system, that the current location of the rider is within a first proximity of a defined route being traversed by a number of autonomous vehicles;
    providing, by the computing system, data indicative of the autonomous vehicles for the rider;
    determining, by the computing system, a selection of the autonomous vehicle indicating that the rider has selected the autonomous vehicle from the number of autonomous vehicles based, at least in part, on a second proximity of the rider to the autonomous vehicle and a vehicle type of the autonomous vehicle, wherein the vehicle type of the autonomous vehicle corresponds to the requested vehicle type;
    obtaining, by the computing system, rider authentication data upon the selection of the autonomous vehicle by the rider; and
    in response to obtaining the rider authentication data, matching, by the computing system, the autonomous vehicle to the rider to provide for performance of the service request for the rider.

2. The computer-implemented method of claim 1, wherein matching the autonomous vehicle to the rider to provide for performance of the service request for the rider further comprises:
  providing, by the computing system, service request data associated with the service request of the rider to the autonomous vehicle.

3. The computer-implemented method of claim 1, wherein obtaining rider authentication data upon the selection of the autonomous vehicle by the rider comprises obtaining rider identification data through a device associated with the autonomous vehicle.

4. The computer-implemented method of claim 1, wherein determining the selection of the autonomous vehicle comprises using wireless radio communication to determine the second proximity; and
  determining that the second proximity is within a defined proximity of the autonomous vehicle.

5. The computer-implemented method of claim 1, wherein the first proximity of the defined route being traversed by the number of autonomous vehicles comprises a location proximity to one or more defined locations along the defined route.

6. The computer-implemented method of claim 5, wherein the one or more defined locations comprise one or more locations that the number of autonomous vehicles are expected to cycle through on a defined frequency.

7. The computer-implemented method of claim 1, wherein the number of autonomous vehicles comprise multiple vehicles of different vehicle types, wherein each vehicle type is indicative of a vehicle size or a vehicle capacity.

8. The computer-implemented method of claim 1, wherein the number of autonomous vehicles comprise multiple vehicles of different vehicle types, wherein each vehicle type is indicative of a ground-based autonomous vehicle, an air-based autonomous vehicle, or a watercraft vehicle.

9. A computing system comprising:
  one or more processors; and
  one or more memories including instructions that, when executed by the one or more processors, cause the one or more processors to perform operations, the operations comprising:
    obtaining a service request from a rider, wherein the service request is indicative of a requested vehicle type;
  obtaining data indicative of a current location of the rider;
    determining that the current location of the rider is within a first proximity of a defined route being traversed by a number of autonomous vehicles;
    providing, to the rider, data indicative of the autonomous vehicles;
    determining a selection of an autonomous vehicle indicating that the rider has selected the autonomous vehicle from the number of autonomous vehicles based, at least in part, on a second proximity of the rider to the autonomous vehicle and a vehicle type of the autonomous vehicle, wherein the vehicle type of the autonomous vehicle corresponds to the requested vehicle type;
    obtaining rider authentication data upon the selection of the autonomous vehicle by the rider; and
    in response to obtaining the rider authentication data, matching the autonomous vehicle to the rider to provide for performance of the service request for the rider.

10. The computing system of claim 9, wherein matching the autonomous vehicle to the rider to provide for performance of the service request for the rider further comprises:
  providing service request data associated with the service request of the rider to the autonomous vehicle.

11. The computing system of claim 9, wherein obtaining rider authentication data upon the selection of the autonomous vehicle by the rider comprises obtaining rider identification data through a device associated with the autonomous vehicle.

12. The computing system of claim 9, wherein determining the selection of the autonomous vehicle comprises using wireless radio communication to determine the second proximity; and
  determining that the second proximity is within a defined proximity of the autonomous vehicle.

13. The computing system of claim 9, wherein the operations further comprise controlling the autonomous vehicle to communicate an available autonomous vehicle status via one or more indicators located on the autonomous vehicle.

14. The computing system of claim 13, wherein the one or more indicators located on the autonomous vehicle comprise one or more lights, and wherein the autonomous vehicle is configured to change a color of the one or more lights to display the available autonomous vehicle status.

15. One or more tangible, non-transitory computer-readable media storing computer-readable instructions that when executed by one or more processors cause the one or more processors to perform operations, the operations comprising:
  obtaining a service request from a rider, wherein the service request is indicative of a requested vehicle type;
  obtaining data indicative of a current location of the rider;
    determining that the current location of the rider is within a first proximity of a defined route being traversed by a number of autonomous vehicles;
    providing, to the rider, data indicative of the autonomous vehicles;
    determining a selection of an autonomous vehicle indicating that the rider has selected the autonomous vehicle from the number of autonomous vehicles based, at least in part, on a second proximity of the rider to the autonomous vehicle and a vehicle type of the autonomous vehicle, wherein the vehicle type of the autonomous vehicle corresponds to the requested vehicle type;
    obtaining rider authentication data upon the selection of the autonomous vehicle by the rider; and
    in response to obtaining the rider authentication data, matching the autonomous vehicle to the rider to provide for performance of the service request for the rider.

16. The one or more tangible, non-transitory computer-readable media of claim 15, wherein matching the autonomous vehicle to the rider to provide for performance of the service request for the rider further comprises:
  providing service request data associated with the service request of the rider to the autonomous vehicle.

17. The one or more tangible, non-transitory computer-readable media of claim 15, wherein obtaining rider authentication data upon the selection of the autonomous vehicle by the rider comprises obtaining rider identification data through a device associated with the autonomous vehicle.

18. The one or more tangible, non-transitory computer-readable media of claim 15, wherein determining the selection of the autonomous vehicle comprises using wireless radio communication to determine the second proximity; and determining that the second proximity is within a defined proximity of the autonomous vehicle.

19. The one or more tangible, non-transitory computer-readable media of claim 15, wherein the operations further comprise controlling the autonomous vehicle to communicate an autonomous vehicle status via one or more indicators located on the autonomous vehicle.

20. The one or more tangible, non-transitory computer-readable media of claim 15, wherein the first proximity comprises one or more defined locations along the defined route.

\* \* \* \* \*